Dec. 29, 1959 — CHAANG HUANG — 2,919,355

BI-STABLE TRANSISTOR CIRCUIT

Filed Dec. 31, 1953

INVENTOR
CHAANG HUANG

BY Paul S Martin

ATTORNEY 2,919,355
Patented Dec. 29, 1959

2,919,355

BI-STABLE TRANSISTOR CIRCUIT

Chaang Huang, Ipswich, Mass., assignor, by mesne assignments, to Sylvania Electric Products Inc., Wilmington, Del., a corporation of Delaware Application December 31, 1953, Serial No. 401,657

3 Claims. (Cl. 307—88.5)

The present invention relates to transistor circuits and in particular to transistor switching or wave generating circuits. Transistor circuits are known having a negative input resistance region such that the form of input or controlling impulse is not reproduced in the output of the device. Such circuits are widely used in switching applications; they have been developed especially for use in computers, both for switching application in the usual sense and for digital registers or counters.

One well known type of transistor circuit having such negative resistance region in its input characteristic is the so-called bi-stable or flip-flop circuit. A load impedance, usually a resistor, is connected to the collector of the transistor and a resistor is connected to the base. The latter resistor constitutes a common return connection of the collector circuit to the base, and it is also a return circuit of the emitter circuit to the base. The current through the base impedance produces feedback into the emitter circuit from the collector circuit. The technique of proportioning the foregoing circuit so as to be bistable is well-known, and in such operation, the two stable operating points are established, one in the low positive-resistance region of the input or emitter characteristic and other in the high positive-resistance region of the characteristic, with an intervening negative-resistance region.

In the usual operation, the wave form of such device where used as a square wave generator is poor; and the upper frequency at which the device can be used for switching or for wave generating is limited below what is desirable for certain applications.

Accordingly, an object of the present invention is to devise a novel wave generating circuit employing transistors, improved in respect to operating characteristics.

The nature of the invention and further features thereof will be apparent from the following detailed disclosure of two embodiments that are shown in the drawings. Both of these illustrative embodiments utilize a non-linear resistance element in the emitter circuit of a transistor having a negative-resistance region in its input characteristic. The non-linear resistance device as detailed below has a high-resistance region which has an intercept with the negative-resistance region of the transistor circuit, by virtue of a constant current supply in the input circuit. In one form this non-linear device takes the form of a duplicate transistor circuit whose emitter is connected to the emitter of the principal transistor circuit; and in the other embodiment a semiconductor rectifier is utilized at this point.

For a better understanding of the invention reference should be had with the following detailed disclosure of these embodiments, shown in the accompanying drawings wherein.

Figure 1:
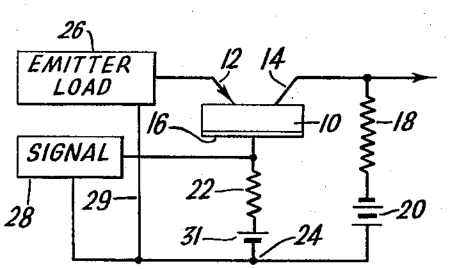
Fig. 1 is the wiring diagram, somewhat schematic, of a conventional transistor in a bi-stable or flip-flop circuit.

In Fig. 1 there is shown the wiring diagram of a conventional bi-stable or flip-flop circuit embodying a transistor. In this circuit a transistor 10 having an emitter connection 12 which is rectifying and collector 14 which is also rectifying has a base connection 16 that is ohmic or non-rectifying and normally of low resistance. The circuit from collector 14 to common point 24 includes a resistor 18 and a direct current supply 20 polarized to make the collector operate in its reverse or low-current condition in the sense of rectifier performance; and the resistor 22 is included between the base connection 16 and common connection point 24, which completes the return of the collector circuit to the base. A suitable current supply 26 is connected via wire 29 between emitter 12 and common connection point 24, so that the emitter circuit is completed from emitter 12 to base 16 through common resistor 22. A signal source 28 is connected to impress "on" and "off" signals across resistor 22, between base connection 16 and common connection point 24. In a well known manner the resistors, the electrical parameters of the transistor, and the power supplies are all related so as to produce the characteristic 30 illustrated in Fig. 2. An optional bias supply 31 may be included in the common base circuit, replacing part or all of the energizing portion of supply 26, which may then be reduced to a low valued resistor, or even a wire. The current in the collector circuit 14, 18, 20, 24 passes through resistor 22; and the current in the emitter circuit 12, 26, 29, 24 also passes through resistor 22. A change in current through base resistor 22 acts to decrease both the emitter and the collector currents or to increase both those currents; and a change in either of those currents acts, by changing the current through base resistor 22, by feed back to induce a corresponding change in the other.

Figure 2:
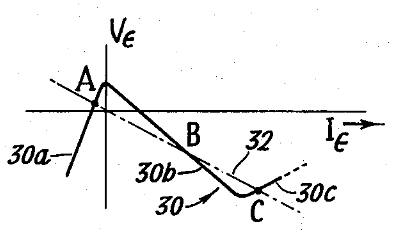
Fig. 2 is the operating characteristic thereof.

The circuit of Fig. 1 operates according to the characteristics of Fig. 2. The circuit is stable and may operate either at point C in the low positive-resistance portion 30*c* of the characteristic 30 of the transistor or it may be operating at point A of that characteristic in its high positive-resistance region 30*a*. These points are determined by the intersection of the constant resistance line 32 of the emitter current supply 26 with the characteristic 30. The emitter operates, in the sense of rectifier performance, in its "forward" conducting condition at point C, and in its "back" or "reverse" condition at point A.

If it be assumed that the transistor circuit is operating in condition A of Fig. 2, then an impulse in signal generator 28 that is positive at the side nearest emitter 12 in relation to base connection 16 will cause the emitter current to shift to a value represented by point C in Fig. 2. This high current is accompanied by a high current at collector 14. A pulse of reverse polarity shifts the transistor from the point C back to point A. The transistor cannot operate at point B in the negative resistance region 30*b* of the characteristic since the resistance of the emitter circuit represented by line 32 is less than the negative-resistance of the transistor, as represented by the comparative slopes of the characteristics. It would do no good to increase the value of emitter circuit resistance for this would merely result in the elimination of the multiple intercepts of the circuit resistance line 32 with the input resistance characteristic 30 of the circuit.

Figure 3:
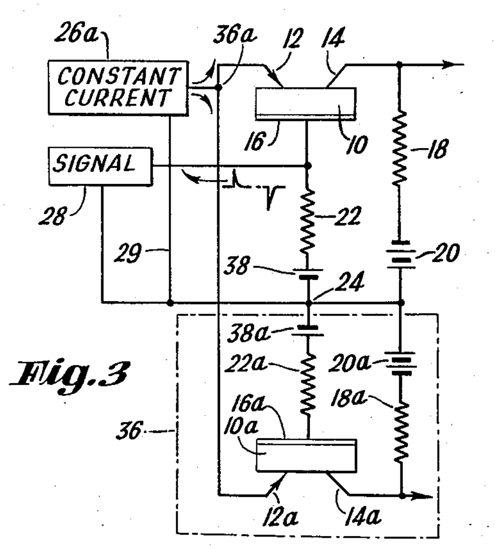
Fig. 3 is the wiring diagram, somewhat schematic, of a bi-stable flip-flop transistor circuit embodying features of the present invention.
Figure 6:
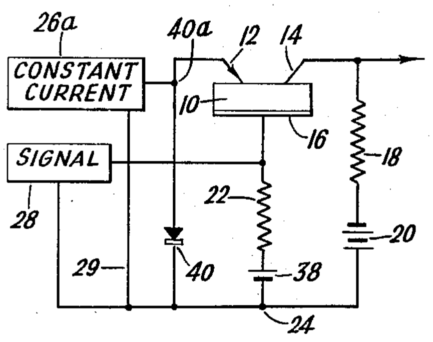
Fig. 6, is the wiring diagram, somewhat schematic, of a bi-stable flip-flop transistor circuit embodying other features of the present invention.

In Figs. 3 and 6 there are shown two embodiments of the present invention in which the input circuit resistance, apart from the transistor, is given a non-linear characteristics. This is accomplished by incorporating a non-linear semiconductor device. In Fig. 3 a transistor circuit is used and in Fig. 6 a rectifier is used, both being of the same type of "base" (P-type or N-type) as transistor 10 when connected across the emitter current supply as shown. When this is done it becomes possible to obtain multiple intercepts with the transistor circuit characteristic 30 without requiring operation of the transistor in the extreme high-current positive-resistance region.

The circuit of Fig. 1 operates to shift from a low current condition of operation to an extremely high current condition of operation in response to "on" triggering pulses and "off" triggering pulses in succession. The triggering pulses of supply 28 are represented by trace 28′ in Fig. 5. At the collector 14 the wave 14′ consists of a series of relatively sharp rises **14*a*, "on" intervals 14*b* and, more or less gradual declines in current 14*c* which terminate in "off" intervals 14*d* that should approximate the steady state current level 14*e*** in the positive resistance region of the characteristic. The collector current change is no replica of the input pulses, as in an ordinary amplifier; but instead a sort of switching or "flip-flop" operation results, where the sustained high current condition represents "on" and the sustained low current condition of the collector represents "off."

The circuit in Fig. 3 embodies features of the present invention but, as will be explained in connection with the operation of the device in Fig. 3, certain very important advantages are attained. In Fig. 3 semiconductor body 10 with its point-contact emitter 12 and its point-contact collector 14 and its base connection 16 are shown identical to that of Fig. 1, and a base resistor 22 is similarly employed together with a collector load resistor 18 and collector power supply 20. A modified current supply **26*a* is provided for emitter 12, connected from the emitter, via line 29 to common connection 24. Signal supply 28** appears in Fig. 3, just as in Fig. 1. That the transistor is of the point-contact type is significant in attaining the required negative resistance region in the characteristic.

The circuit of Fig. 3 includes a non-linear resistance device 36 connected between emitter 12 and common connection 24; and an additional direct-current supply 38 is provided (for bias) between connection 24 and base resistor 22. Viewed otherwise, this device is in shunt with supply 26; and it might be incorporated in that supply where suitable.

Figure 4:
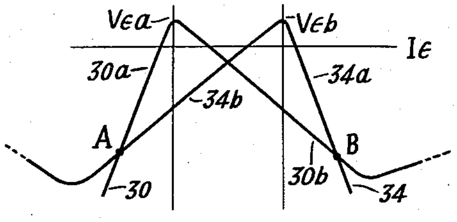
Fig. 4 is the operating characteristic thereof.

Device 36 in Fig. 3 takes the form of a transistor duplicating that previously described and accordingly includes semiconductor body **10*a* having emitter 12*a*, collector 14*a*, base connection 16*a*, collector load resistor 18*a* and collector supply 20*a*, and has a base resistor 22*a* between base connection 16*a* and bias supply 38*a*. This, in turn, is connected to common connection 24 of the principal transistor circuit. The circuit associated with transistors 10, 12, 14, 16 may be conveniently referred to as the principal transistor circuit and that enclosed in rectangle 36 may be referred to conveniently as the "auxiliary" transistor circuit. Device 36 has a connection 36*a* with the wire connecting constant current supply 26*a* and emitter 12. Both the principal and the auxiliary transistor circuits are proportioned in known manner to have the same emitter characteristics, involving a high positive resistance and low current portion followed by a negative-resistance region and then a low positive-resistance and high current condition. These are shown in Fig. 4, where the characteristics 30 and 34 correspond respectively to the principal transistor circuit and the auxiliary transistor circuit. Supply 26 which limits the total currents available to both emitter 12 and 12*a* prescribes a fixed maximum current available to both. It may simply be a battery in series with a large resistance. Accordingly the whole system will come to rest at a point A or a point B when the system is first turned on. Other conditions between A and B are unstable and the regions outside of A and B are impossible for lack of extra drive required to exceed the stable points A and B. Signal source 28 will affirmatively establish the high or the low current condition, "on" or "off" of collector 14**, in response to the corresponding control pulse or signal.

Viewed from emitter 12, the supply of emitter current may be considered as a single composite of supply 26, modified by device 36. Rather than having a straight line characteristic, this supply is seen to have a characteristic which is the inverse of the emitter characteristic of the principal transistor circuit; that is, the composite current supply **26*a* and the emitter 12 of 36 exhibit a low current and high resistance at a time when emitter 12 is carrying moderately high current and represents negative resistance; and when emitter 12 carries low current and represents high resistance, the composite emitter current supply provides moderately high current at negative resistance. The current controlling circuit for emitter 12** of the principal transistor circuit has a non-linear characteristic which is the inverse of the input characteristic of the principal transistor circuit.

It is notable in Fig. 4 that the positive resistance portion **30*a* of characteristic 30 intersects characteristic 34 in the negative resistance region 34*b* of that characteristic and similarly the positive resistance portion 34*a* of characteristic 34 intersects the negative resistance portion 30*b* of characteristic 30. Neither the principal transistor circuit nor the auxiliary transistor circuit reaches the high-current positive resistance portion corresponding to 30c of Fig. 2. This signifies that, in each transistor circuit of Fig. 3, each individual emitter current is held to a much lower value than the emitter current of Fig. 1 when in the high-current condition of its operation. The current drawn by both emitters 12 and 12*a* in Fig. 3 is less than the current drawn by emitter 12** of Fig. 1 since one or the other of the emitters in Fig. 3 is biased into "back" conduction.

This reduced peak emitter current achieved with the circuit of Fig. 3 may explain the improved operation which has been achieved in practice with the circuit of Fig. 3. With this circuit far higher frequencies of operation are possible than are attainable with the circuit of Fig. 1 and the changes from "on" to "off" are sharper, a further advantage where square-wave output of collector signals is of importance.

Figure 5:
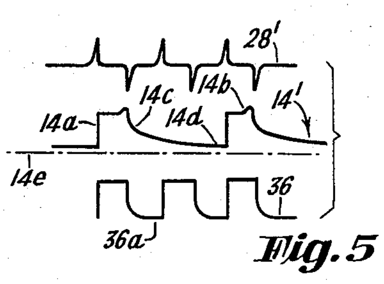
Fig. 5 is a comparative illustration of a control signal and the response wave forms of the circuits in Figs. 1 and 3 respectively.

In Fig. 5 a series of signals 28′ which are emitted by the signal source 28 are shown opposite operating characteristic 14′ previously described; and characteristic 36 is shown, representing the collector operation of Fig. 3. It will be observed that curve 14′ has rounded gradual trailing portions **14*c* whereas this region 36*a* is far sharper. The theoretical explanation for this is that the collector, before it can change from its high current condition to its low current condition in response to an "off" pulse from signal supply 28, must clean up the minority carriers in the semiconductor body 10 that have a high density during the high current condition C of Fig. 2. This imposes a delay time and prevents the collector current from immediately following the sharp "off" pulses supplied. The concentration of these minority carriers in body 10 is extremely high where the "on" condition of the transistor is at the operating point C in Fig. 2. Unlike this however is the reduced concentration of minority carriers in body 10** when the operating condition represented by point B in Fig. 4, corresponding to a much lower emitter current. With a reduced concentration of minority carriers, the response of the collector to the control signal is much more immediate and sharper.

It is noted that curve 28′ shows a large number of "on" and "off" pulses whereas curve 14′ shows fewer "on" and "off" responses. This diagrammatically illustrates the fact that the circuit of Fig. 1 is incapable of following high frequency pulses, presumably because the circuit is still shifting to its "off" condition and has high emitter current when the "on" trigger arrives. Curve 36 has as many "on" and "off" responses as there are triggering pulses of curve 28′, thus representing higher frequency of operation. This is explained by the reduced concentration of minority carriers which must be eliminated (in Fig. 3 as compared to Fig. 1) before the transistor circuit can be said to be "off" in response to "off" signal pulse. Before the circuit can be responsive to an "on" pulse, the collector current must have stabilized in its "off" condition and it cannot do so long as collection of minority carriers continues. Since this is achieved much more quickly in the circuit of Fig. 3 because of lower "on" current of each transistor, the operating frequency of the circuit in Fig. 3 is far higher than is possible in the circuit in Fig. 1.

Tracing the circuit from emitter 12 in Fig. 3 to base connection 16 it is seen that there are parallel branch circuits from junction 36*a* to common connection 24, including constant current supply 26*a* and non-linear device 36. The novel embodiment of Fig. 3 has excellent characteristics; yet it is susceptible of considerable simplification where this may be desired. In the embodiment of certain aspects of the invention shown in Fig. 6, a non-linear device 40, a crystal rectifier, takes the place of the entire non-linear device 36. This rectifier is connected, as in the case of device 36, between junction 40*a* of emitter 12 and current supply 26*a*, and to terminal 24. Thus rectifier 40 is connected in parallel with current supply 26*a*.

Figure 7:
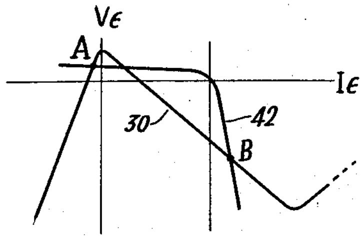
Fig. 7 is the operating characteristic thereof.

Rectifier 40 is polarized so as to forward-conducting in the same direction as emitter 12. Considered from the point of view of current supply 26, current flows to emitter 12 and to rectifier 40 through branch circuits so that these two paths share the limited current available from supply 26*a*. In this circuit device 40 has a non-linear characteristic 42 (Fig. 7) which is the inverse of the characteristic 30 of emitter 12. Characteristics 30 and 42 have two stable intercepts A and B. The device operates at a comparatively low "on" current as represented by point B of transistor characteristic 30, in contrast to the high "on" current of point C of Fig. 2. The operation of the circuit of Fig. 6 is represented substantially by curve 36 in Fig. 5. Like Fig. 3, the circuit of Figure 6 has the same high frequency and sharp square-wave operating characteristic to recommend it as an improvement over Fig. 1. Fig. 6 involves a substantial reduction in number of components and is advantageous for this further reason. It is frequently of value to have two complementary output signals such as are available in the circuit of Fig. 3, at collectors 14 and 14*a* respectively. In Fig. 6 only the single output signal is available.

From the foregoing disclosure of two specific illustrative embodiments of the invention it will be appreciated that those skilled in the art will readily find varied application of the invention and various further modifications thereof will be readily apparent. Accordingly the appended claims should be interpreted broadly, consistent with the spirit and scope of the invention.

What is claimed is:

1. An electrical circuit including a transistor having a collector and an emitter and further having a load impedance and energizing means connected to the collector and having a further impedance connected to the base, the foregoing circuit being proportioned to have a negative resistance region in its characteristic between a low-current and a high-current positive resistance region, a further transistor circuit having a load impedance and energizing means connected to the collector, the emitters of said transistors being connected together and the bases of the two transistors being interconnected by separate impedances, said further circuit being proportioned to have a negative resistance region in its characteristic between a low-current and a high-current positive resistance region, and having a constant current direct current supply connected to said emitters and producing an intercept between the low current positive resistance region of the characteristic of each transistor circuit with the negative-resistance region in the characteristic of the other transistor circuit.

2. A bi-stable transistor circuit comprising a pair of transistors having their emitters connected together, a constant-current supply for said emitters, a pair of impedances and biasing means in the base circuits of said transistors, separate impedances in the collector circuits of said transistors, and means for applying a signal to the base connection of one of said transistors to shift the circuit from a condition in which one transistor is in its low-current region and the other in its negative resistance region, to a condition in which the conditions of the transistors are substantially interchanged.

3. A bi-stable transistor circuit comprising a pair of transistors having their emitters connected together, a constant-current supply therefor, separate feedback impedances in the base circuits of the transistors, means for applying a signal to the base connection of one of the transistors, and connections for deriving from the collectors signals of opposite polarity and substantially equal currents.

References Cited in the file of this patent

UNITED STATES PATENTS

| | | |
|---|---|---|
| 2,533,001 | Eberhard | Dec. 5, 1950 |
| 2,605,306 | Eberhard | July 29, 1952 |
| 2,622,212 | Anderson et al. | Dec. 16, 1952 |
| 2,629,833 | Trent | Feb. 24, 1953 |
| 2,641,717 | Toth | June 9, 1953 |
| 2,644,896 | Lo | July 7, 1953 |
| 2,663,800 | Herzog | Dec. 22, 1953 |
| 2,663,806 | Darlington | Dec. 22, 1953 |
| 2,666,819 | Raisbeck | Jan. 19, 1954 |
| 2,691,075 | Schwartz | Oct. 5, 1954 |
| 2,726,370 | Linvill et al. | Dec. 6, 1955 |
| 2,791,644 | Sziklai | May 7, 1957 |